No. 888,963. PATENTED MAY 26, 1908.
F. DAHLUND.
FEED CUP FOR SEED DRILLS.
APPLICATION FILED FEB. 6, 1908.
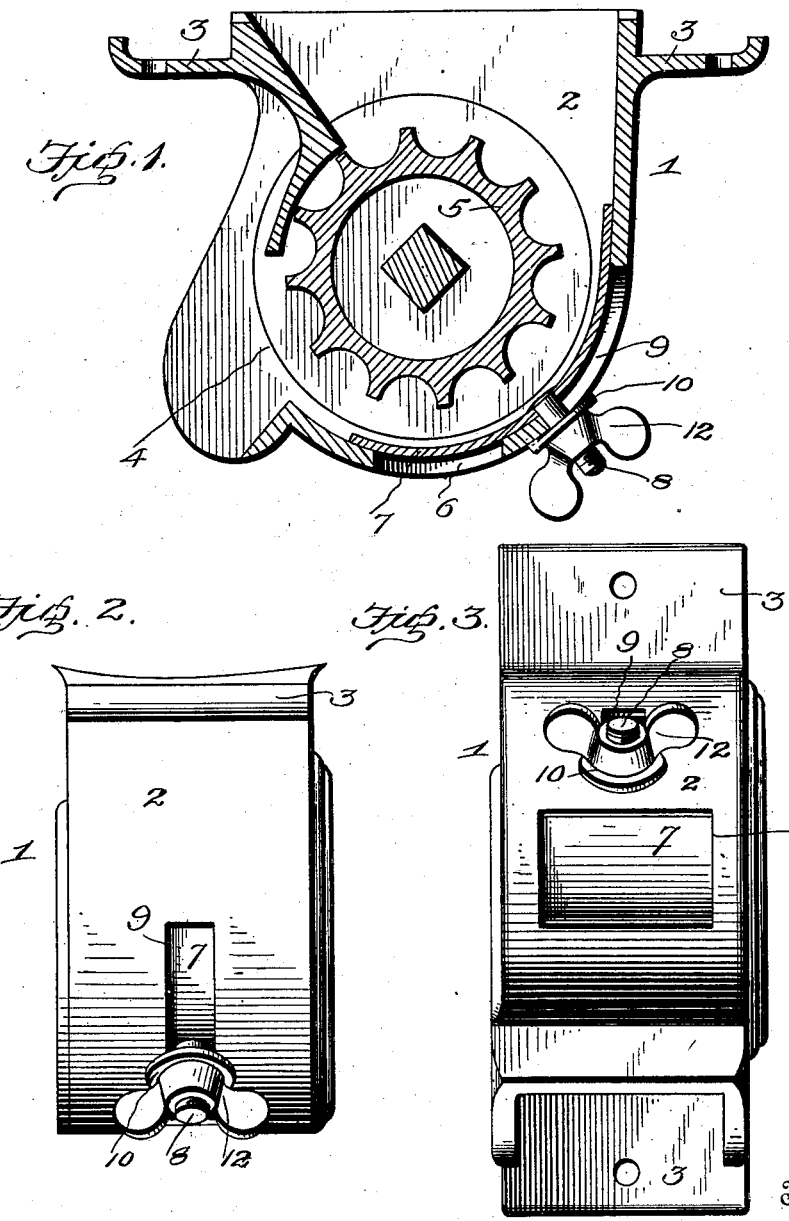

UNITED STATES PATENT OFFICE.

FRANK DAHLUND, OF ESMOND, NORTH DAKOTA.

FEED-CUP FOR SEED-DRILLS.

No. 888,963.

Specification of Letters Patent.

Patented May 26, 1908.

Application filed February 6, 1908. Serial No. 414,606.

*To all whom it may concern:*

Be it known that I, FRANK DAHLUND, a citizen of the United States, residing at Esmond, in the county of Benson and State of North Dakota, have invented certain new and useful Improvements in Feed-Cups for Seed-Drills; and I do declare the following to be a full, clear, and exact description of the invention, such as will enable others skilled in the art to which it appertains to make and use the same.

This invention relates to improvements in feed cups for seed drills.

The object of the invention is to provide a feed cup of this character having means whereby the same may be readily cleaned out when changing from one kind of seed to another, whether the operating mechanism is in or out of gear.

With this object in view, the invention consists of certain novel features of construction, combination and arrangement of parts as will be more fully described and particularly pointed out in the appended claims.

In the accompanying drawings, Figure 1 is a vertical longitudinal sectional view through a seed cup constructed in accordance with the invention; Fig. 2 is an edge view; and Fig. 3 is a bottom plan view of the same.

Referring more particularly to the drawings, 1 denotes the seed cup which may be of any style or design, and is here shown as comprising a casing, 2, provided on its upper end with flanges, 3, by means of which it is secured to a feed box, or hopper. In the forward edge of the casing, 2, is formed seed-discharge passage, 4, through which the seed is adapted to be fed into the ordinary drill tubes.

Revolubly mounted in the casing, 2, is a fluted or corrugated feed cylinder, 5, said cylinder being revolved by the usual operating shaft which passes therethrough as shown.

In the lower side or edge of the casing is formed a rectangular clean-out opening, 6, over which on the inner side of the casing, is adapted to slide a curved closing plate, 7, said plate being adapted to be opened or closed and locked in its various positions by means of a bolt, 8, which is secured thereto and projects through a vertically disposed slot, 9, formed in the curved rear edge of the casing, as shown. On the bolt, 8, is arranged a clamping washer, 10, and on the threaded outer end of the bolt is adapted to be screwed a winged nut, 12, which, when screwed up on said bolt, will clamp the washer, 10, into engagement with the outer side of the casing, and thereby draw the closing plate into tight engagement with the inner side of the casing, thus holding the same in a closed or open position, the plate being moved to an open or closed position by moving the bolt, 8, up or down in the slot, 9.

By providing the clean-out opening 6 in the casing, 2, of the cup, the latter may be readily cleaned out whether the parts are in or out of gear, thus providing for the quick changing of the machine for feeding different kinds of seed, the clean-out opening permitting the removal of seed from the cup and the corrugated surface of the feeding cylinder as will be readily understood.

Having thus particularly described my invention, what I claim as new, and desire to secure by Letters-Patent, is:

1. A feed cup for seed drills, comprising a casing having a seed discharge passage and a clean out passage, a plate to cover and uncover said clean out passage and means to coact with said casing to hold said plate in position to cover and uncover said passage, substantially as described.

2. A feed cup for seed drills comprising a casing having formed in its lower edge a clean-out passage, a curved closing plate arranged on the inner side of said casing and adapted to be moved back and forth across said passage to open and close the same, a bolt connected to said plate, and a nut arranged on said bolt to coact with the casing to hold the plate in its adjusted positions, substantially as described.

3. A feed cup for seed drills comprising a casing having a seed discharge passage, a clean-out passage, and a vertically disposed slot, a segmental covering plate slidably mounted in the inner side of said casing over said clean-out passage, a bolt on said plate and projecting through said slot, a clamping washer on said bolt, and a nut adapted to be screwed into engagement with said washer to clamp the same against the outer side of the casing and thereby draw said plate into tight engagement with the inner side of the casing, thus holding the same in an open or closed position, substantially as described.

In testimony whereof I have hereunto set my hand in presence of two subscribing witnesses.

FRANK DAHLUND.

Witnesses:
A. ENGEL,
E. O. CRAIG.